July 23, 1940.                Y. A. AHNGER                2,209,254
                      FRICTION TRANSMISSION DEVICE
                Filed July 29, 1938         3 Sheets-Sheet 1
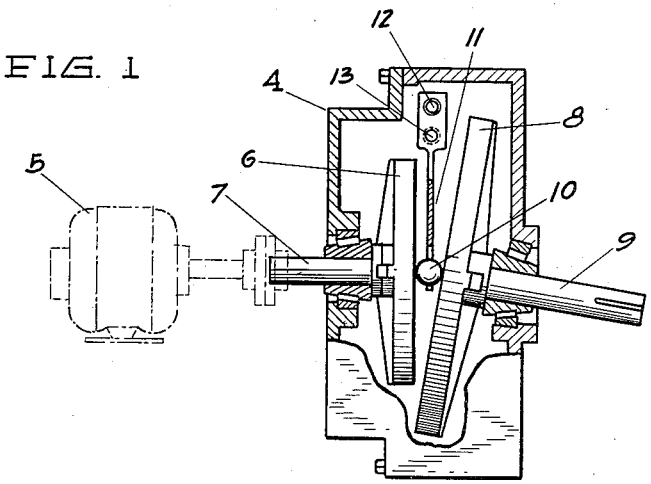
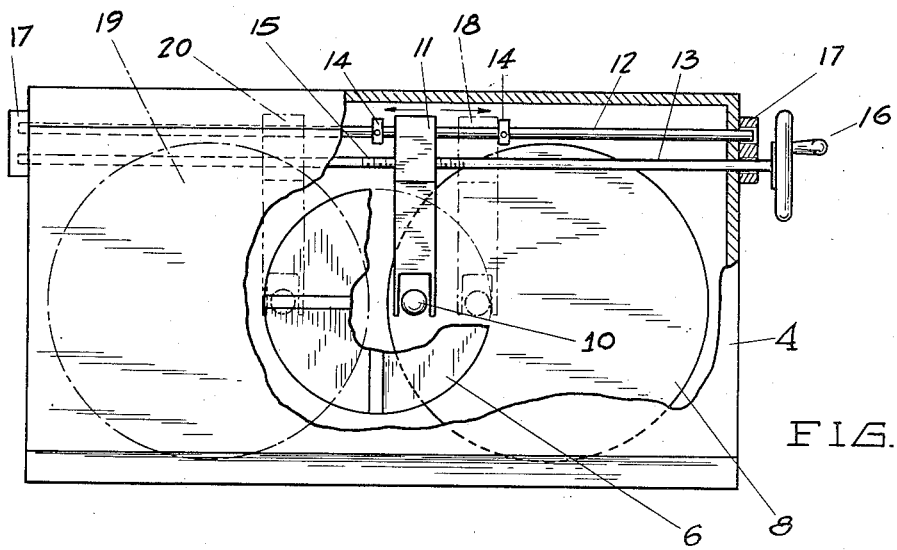
INVENTOR.
YRJÖ A. AHNGER
BY Henry B. Lister
ATTORNEY.

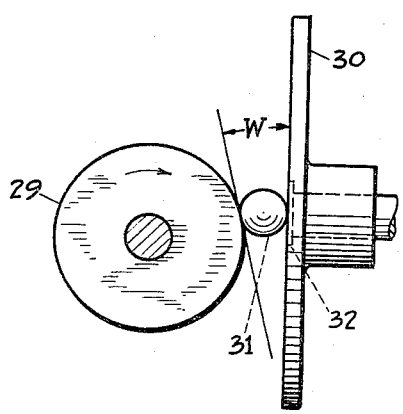
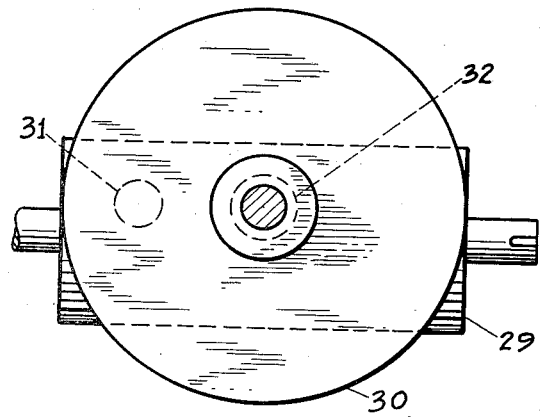
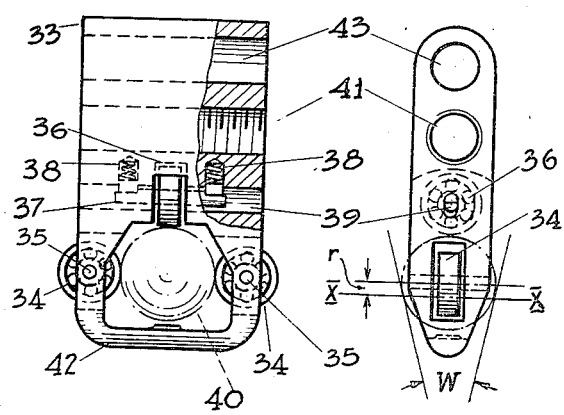
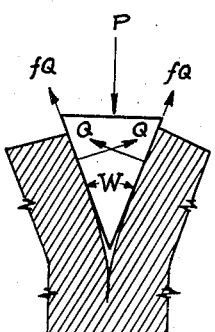
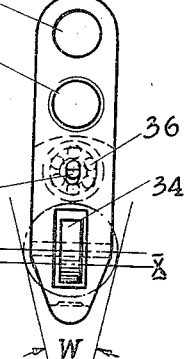
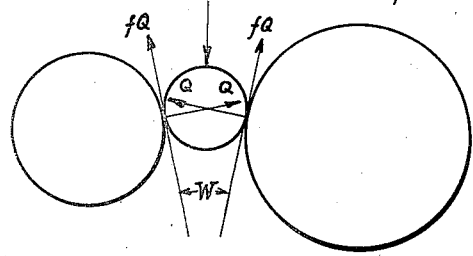
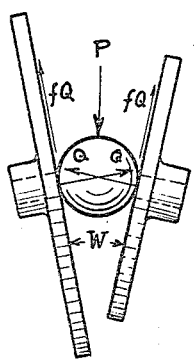

July 23, 1940.  Y. A. AHNGER  2,209,254
FRICTION TRANSMISSION DEVICE
Filed July 29, 1938   3 Sheets-Sheet 3

INVENTOR
YRJO A. AHNGER
BY Henry B. Lister
ATTORNEY

Patented July 23, 1940

2,209,254

UNITED STATES PATENT OFFICE 2,209,254

FRICTION TRANSMISSION DEVICE

Yrjö A. Ahnger, Crockett, Calif.

Application July 29, 1938, Serial No. 221,998

8 Claims. (Cl. 74—198)

This invention relates to variable speed and constant speed friction drive transmission devices, in which power is transmitted from a revolving driving member to a revolving driven member by an intermediate revolving member of cylindrical, conical or spherical shape.

The driving member and the driven member are positioned in such relation to each other that the intermediate member transmits to the driven member the speed of the driving member at the same speed of rotation or at a less speed or at an increased speed according to its position; the intermediate member is held against the two other members substantially by its own weight or an equivalent force, depending upon the position of the members.

The object of this invention is to provide an improved transmission device of this type, which is simple and compact in construction, is efficient in operation and is inexpensive to manufacture.

It is also an object to provide certain details and features of construction and combinations by which a speed transmission of this type can produce an infinitely variable speed transmission within its range.

It is also an object to provide certain details and features of construction and combinations by which a speed transmission device of this type can produce any desired reversible speed within its range.

It is also an object to provide certain details and features of construction and combinations by which a speed transmission device of this type can produce any desired constant speed within its range without the necessity of changing any of the revolving members of the speed transmission; this results in great economy of manufacture.

A further purpose of this invention is to place those members of the drive which are in frictional driving contact with each other, into such relationship to each other that the pressure between the members automatically increases in the same proportion as the load to be transmitted increases, and said pressure decreases in the same proportion as the load to be transmitted decreases.

For a better understanding of the invention reference should be made to the accompanying drawings wherein are shown, by way of illustration and not of limitation, preferred embodiments thereof.

In the drawings like numerals refer to like parts throughout the several views:

Fig. 1 is a side view of the variable speed friction transmission.

Fig. 2 is a front view of the variable speed friction transmission.

Fig. 3 is a modified form of the transmission device.

Fig. 4 is a side view of a disc wheel and a cylindrical wheel with an intermediate ball for variable, reversible speed transmission.

Fig. 5 is a front view of Fig. 4.

Fig. 6 is a front view of a yoke for speed control mechanism.

Fig. 7 is a side view of Fig. 6.

Fig. 8 shows a common wedge to illustrate the principles involved.

Fig. 9 is a side view of two disc wheels and a ball between them.

Fig. 12 is a sectional elevation of Fig. 11.

Figure 10:
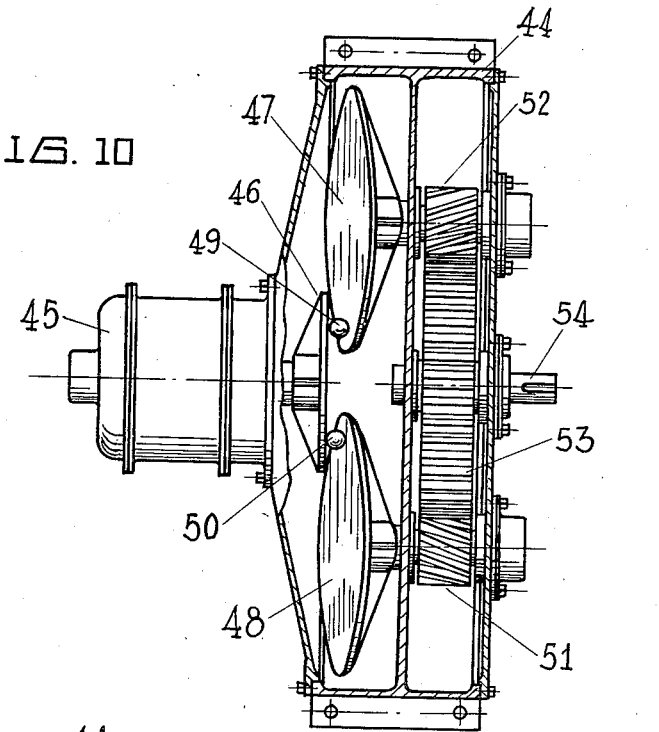
Fig. 10 is an end view of two cylindrical wheels and a ball or roller between them.

The invention in its simplest form consists of a driving wheel 6, an intermediate revolving member 10, and a driven wheel 8. These elements of the drive are so disposed to each other that the common tangential plane for the driving member and the intermediate member forms an angle with the common tangential plane for the intermediate member and the driven member.

The driving member 6 must revolve in such direction that it has a tendency to force the intermediate member 10 towards the vertex of the angle of inclination between the planes of the driving member and the driven member.

When the angle of inclination between the driving disc and the driven disc is small enough no slipping can take place between the driving member 6, and the intermediate member 10 and the driven member 8. The size of the angle can be determined experimentally and theoretically. According to theory the said angle of incidence between discs 6 and 8 must be smaller than twice the friction angle of the materials in contact, otherwise slippage will occur unless sufficient external pressure is applied on the intermediate member.

In the embodiment of the invention illustrated in Figure 1 and Figure 2, the several working parts are supported by a housing 4, partly broken to show the interior. The motor 5 transmits its power through shaft 7 to the driving disc 6. In close proximity to driving disc 6 is the driven disc 8, which is inclined at an angle to driving disc 6 with the vertex of the angle below the discs.

The intermediate spherical member 10 is preferably operated along a line which is drawn between the centers of disc 6 and disc 8 as shown by the side view in Figure 1. The intermediate member 10 is operated and held in any required position by yoke 11, which is supported by and slides along the rod 12, on which are the stops 14. There is a male thread 15 on rod 13, which passes through the female thread in yoke 11. The hand wheel 16 turns the thread of rod 13, which causes yoke 11 to assume any position between the stops 14. By this method the intermediate member 10 as shown in Figure 2, can be drawn towards the center of driving member 6, and at the same time drawn towards the circumference of driven member 8. This will cause a reduction of the number of revolutions of the driven member in relation to the driving member and consequently the driven shaft 9 will revolve slower than the driving shaft 7. By moving the yoke 11, by means of handwheel 16 to the opposite stop 14, the intermediate member 10 will be nearer the circumference of the driving member 6 and nearer the center of driven member 8, which will cause an increase in the number of revolutions of driven shaft 9. When the intermediate member 10 is placed at a point which is equidistant from the centers of disc 6 and disc 8, the driving shaft 7 will rotate at exactly the same speed as driven shaft 9. The change in position of yoke 11 to change the speed is shown by dotted lines 18.

In Figure 2, yokes 18 and 20 indicate adjusted positions of yoke 11.

The structure shown in Figures 4 and 5 represents a reversible, variable speed drive in which the cylindrical wheel 29 drives the disc wheel 30 through the intermediate ball 31. In order to vary the speed of disc wheel 30 and to reverse the direction of its rotation, the ball 31 must be moved along its path across the face of disc wheel 30. Each time the ball passes the center of disc 30, the direction of rotation of said disc wheel reverses. It is to be noted that when ball 31 is exactly opposite the center of disc 30 no power transmission can take place. Notch 32 has been provided in order that the ball could not be in driving contact with the driving and driven members when close to the center of disc wheel 30. A yoke should be used of the type shown in Figures 6 and 7 with a bar 42 to prevent the ball 31 from moving far enough toward the vertex of angle W to re-establish driving contact with the driving and driven members while within the notch 32. Otherwise, the means for moving the intermediate ball back and forth could be the same as shown in Figures 1 and 2 or any other ordinary means.

This drive will operate without slippage between the driving, intermediate and driven members provided the driving member 29 revolves in the direction shown by the arrow and the angle W is smaller than twice the friction angle of materials in contact. The angle W is formed by the common tangential planes for the driving and driven members and the intermediate member. The common tangential plane of the ball 31 and disc wheel 30 coincides with the disc surface.

It is obvious that the cylindrical wheel 29 can be replaced by a conical wheel, the face of the disc wheel 30 being parallel with the near side of the conical wheel.

It is also obvious that the disc wheel 30 can be replaced by a conical wheel with the axis of the cylindrical wheel 29, parallel with the near side of the conical wheel.

In cases where a speed transmission is subjected to vibration (for instance automobile drives) it is necessary to exert an external force to keep the intermediate member in constant contact with the driving and driven members of the transmission. The same is true in those cases where the transmission is in such position that the intermediate member would fall away unless held in place. Additional pressure must also be applied on the intermediate member when the angle between the common tangential planes for the driving and driven members and the intermediate member is larger than twice the friction angle of the materials in contact.

The additional pressure on the intermediate member can be applied by the yoke 33, shown in Figures 6 and 7, which is similar to yoke 11, shown in Figures 1 and 2, and can be used in its place. The yoke 33 possesses, however, refinements not found in yoke 11. Ball bearings 34 are mounted on stationary shafts 35 and serve to reduce friction when yoke 33 is moving ball 40 along its path for speed changing purposes. Ball bearing 36, mounted on shaft 37 is intended to exert pressure on ball 40 to the extent required. This pressure is brought about by the two springs 38 which press against the flattened ends of shaft 37, which shaft can move toward the bar 42 and away from it in the oval hole 39. The bar 42 is intended to limit the extent of play of ball 40.

The hole 43 is provided so that the yoke can slide along a guiding rod, for example rod 12 in Figures 1 and 2. The threaded hole 41 is provided for a speed control screw such as for example screw 15 on rod 13 in Figure 2.

As mentioned before, and also indicated in Figure 7, the common tangential plane at the contact point between the driving member and the ball 40 forms an angle W with the common tangential plane at the contact point between the ball 40 and the driven member. A line X—X, Figure 7, through these contact points forms an instantaneous axis of rotation around which the ball 40 rotates when moved by yoke 33 for speed control purposes. This axis X—X lies at a distance r from the center of the ball. This shows that the ball 40 revolves on the two contact surfaces when its position is changed for speed control purposes.

As stated before in these specifications, the friction gearing described will transmit power without slippage provided the angle, which the common tangential plane for the driving member and the intermediate member forms with the common tangential plane for the intermediate member and the driven member, is smaller than twice the friction angle of the materials in contact, and the direction of rotation of the driving member is such that it has a tendency to force the intermediate member toward the vertex of said angle.

The law which governs the actions of a wedge can also be used to prove the above assertion. In this connection, reference should be had to Figures 8 to 10 inclusive.

Figure 8 shows a common wedge, the sides of which form the wedge angle W as noted.

Figure 9 shows two disc wheels which form an angle W with each other as noted and a ball resting against the surfaces of the disc wheels.

Figure 10 shows an end elevation of two cylindrical wheels and an intermediate ball or roller, so disposed toward each other that the common tangential planes for the outer members and the intermediate member form an angle W with each other.

When a force P, in above mentioned figures, acts upon the wedge or the ball or roller in such manner that its direction line divides the angle W into two equal parts, the side pressure forces Q are of equal size and the friction forces $fQ$ act upward as noted. According to the laws of mechanics, the relationship between these forces is expressed by the well known equation (see for example Machinist's Handbook)

$$P = 2Q(\sin W/2 + f \cos W/2)$$

Taking into consideration that the coefficient of friction $f = \tan k = \sin k/\cos k$ ($k$ being the friction angle), the above equation can also be written, after simple transformation, in the form $$P = \frac{2 \sin (W/2 + k)}{\cos k} Q$$

From everyday experience we know that a driven wedge often is forced to slide out by side pressure forces Q. In order to establish the conditions under which a driven wedge cannot be forced out by the side pressure forces Q we can utilize the above equation for force P. We have to note, however, that in this case the friction forces $fQ$ are directed downward for which reason the equation now reads $$P = \frac{2 \sin (W/2 - k)}{\cos k} Q$$

The force P is positive when it acts in the direction shown in illustrations, that is toward the vertex. Three instances are possible, depending on whether $$W/2 \gtreqless k$$

If $W/2 > k$ we get, from above equation, a positive force P. This signifies that we require an external force to prevent the wedge or the ball or the roller from sliding out.

If $W/2 = k$ we get, from above equation, $P = 0$ which signifies that the wedge barely stays in.

If $W/2 < k$ we get, likewise from above equation, a negative value for the force P. This signifies that the wedge or the ball does not slide out (no slippage occurs) unless an external force is used to loosen the wedge or the ball. The size of this external force is $$-P = \frac{2 \sin (k - W/2)}{\cos k} Q$$

This last mentioned case, when $W/2 < k$ or $W < 2k$, proves our assertion, namely, that no slippage occurs when the wedge angle W is smaller than twice the friction angle $k$. On the other hand, if the wedge angle W is larger than twice the friction angle $k$, the intermediate member will slip and can transmit power from the driving member to the driven member only if an external force is applied to press the intermediate member against the driving and driven members.

The force $fQ$ (see Figures 9 and 10) represents the peripheral driving force of, for instance, an electric motor. The coefficient of friction $f$ is a constant. Thus, when the motor runs under full load, Q is twice greater than when the motor runs under half load.

From this we see that:

The pressure between the driving and driven members and the intermediate member is directly proportional to the load to be transmitted.

It can be seen from above equation for $-P$ that when the peripheral force $fQ$ and consequently Q increases, the numerical value of $-P$ increases in the same proportion, or in other words, the greater the torque to be transmitted, the firmer does the intermediate member become lodged between the driving and driven members with no possibility of slippage.

Figure 11:
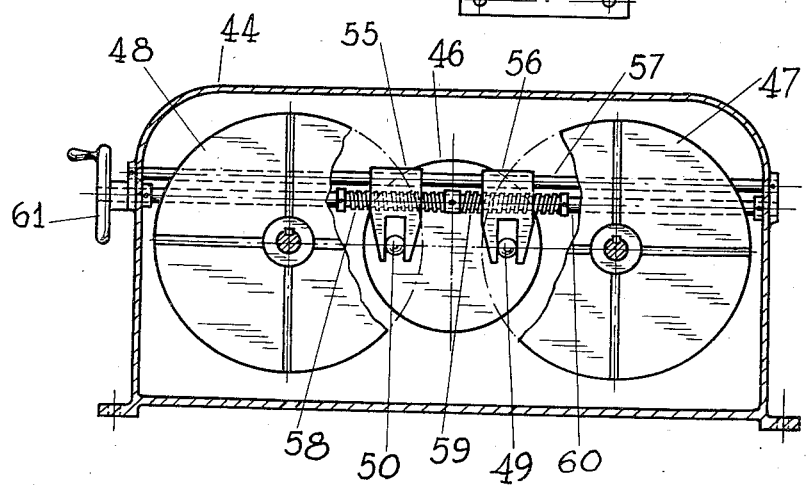
Fig. 11 is a sectional plan view of a reversible variable speed friction transmission.

In the embodiment of the invention illustrated in Figure 11 and Figure 12, the several working parts are supported by housing 44.

The motor 45 supports at the end of its shaft the driving disc wheel 46. In close proximity to this driving disc wheel are two driven disc wheels 47 and 48, which are inclined at an angle to the driving disc wheel 46 with the vertex of the angle below the discs.

Either of the intermediate balls 49 and 50 can transmit the power from the driving disc wheel 46 to the driven disc wheels 47 and 48. Depending upon the direction of rotation of the motor and the driving disc 46, it has a tendency to force one of the balls 49 and 50 toward the vertex of the angle of inclination between the driving and the driven disc wheels forcing that ball into driving contact between the disc wheels while the other ball is idling.

Mounted on the shafts of the disc wheels 47 and 48, are gears 51 and 52, which engage another gear 53 mounted on the output shaft 54. By suitably selecting this gearing, it is possible to have the output shaft 54 parallel with the motor shaft, for instance, both horizontal.

To change the speed of the output shaft 54, the balls 49 and 50 are operated along a line drawn between the centers of discs 48, 46 and 47. Said balls are operated and held in any desired position on their path by yokes 55 and 56. Yoke or cage 33, Figure 6, could be substituted in place of yokes 55 and 56 if desired. Yokes 55 and 56 are supported by rod 57 and propelled back and forth as desired by the right-hand screw 58 and left-hand screw 59 on rod 60, which can be turned by means of the handwheel 61 located at the extreme end of rod 60.

Having thus described my invention, which is not limited to the means herein shown;

I claim:

1. A frictional transmission device in which a circular driving disc is so arranged that on the right hand there is a circular driven disc the circumference of which overlaps the driving disc to the center or near the center of the driving disc, the inclination of the driven disc to be at an angle to the driving disc sufficient to frictionally engage an intermediate spherical member so that the driving member will frictionally engage said intermediate member when the same is operated by gravity, and thereby turn the driven member, in combination with a similarly situated driven disc on the opposite side of the driving disc, which has its own similar intermediate member, with means for moving and retaining in position either or both of said intermediate members for the purpose of reversing the direction of rotation at will by reversing the motor, all substantially as described.

2. In a transmission mechanism comprising a driving disc wheel and a driven disc wheel apart from each other, a ball in tangential contact with the driving and the driven disc wheels, said disc wheels inclining toward each other at an angle smaller than twice the friction angle of the materials in contact, and rigid bearings which revolvably but inflexibly hold the above mentioned disc wheels in this predetermined inclined position and do not permit any axial movement of the disc wheels, whereby no slipping can take place between the driving disc wheel, the ball, and the driven disc wheel when the driving disc wheel revolves in such a direction that it has a tendency to force the ball toward the vertex of the angle between the driving and the driven disc wheels; also whereby the pressure between the ball and the driving and the driven disc wheels is caused to grow in the same proportion as the torque transmitted grows, and to recede in the same proportion as the torque transmitted recedes.

3. In transmission mechanism comprising a driving disc wheel and a driven disc wheel apart from each other and inclined toward each other, a ball in tangential contact with said driving and driven disc wheels, the combination of (a) bearings to hold both disc wheels revolvably but rigidly at a constant distance from each other and inclining toward each other at an angle smaller than twice the friction angle of the material in contact; (b) a yoke or cage to hold the ball between the disc wheels and move it for speed changing purposes, said yoke being of such construction that it permits slight freedom of motion for the ball toward and away from the vertex of the angle between the disc wheels, whereby no slippage can take place between the driving disc wheel, the ball and the driven disc wheel, when the driving disc wheel revolves in such direction that it has a tendency to force the ball toward the vertex of the angle between the driving and the driven disc wheels, whereby also the pressure between the ball and the driven disc wheels is caused to grow in the same proportion as the torque to be transmitted grows and to recede in the same proportion as the torque to be transmitted recedes.

4. In transmission mechanism comprising a driving disc wheel and a driven disc wheel apart from each other, a ball in tangential contact with said driving and driven disc wheels, the disc wheels inclining toward each other at an angle smaller than that twice the friction angle of the materials in contact and revolvably but inflexibly held in this position by rigid bearings, the driven disc wheel provided with a small, shallow notch or depression on its working face surrounding its axis of rotation, within which notch the ball cannot be in driving contact with the driving or driven disc wheels when moved across the face of the disc wheels for speed regulating and reversing purposes by a yoke of such construction that it limits the distance which the ball is permitted to move toward the vertex of the angle between the driving and the driven disc wheels, when the driving disc wheel revolves in such direction that it has a tendency to force the ball toward the vertex of the angle between the driving and the driven disc wheels.

5. A frictional transmission device in which a circular driving disc is so arranged that on the right hand there is a circular driven disc, the circumference of which overlaps the driving disc to the center or near the center of the driving disc, the inclination of the driven disc to be at an angle to the driving disc sufficient to frictionally engage an intermediate spherical member so that the driving member will frictionally engage said intermediate member and therefore turn the driven member, in combination with a similarly situated driven disc on the opposite side of the driving disc, which has its own similar intermediate member, with means for moving and retaining in position either or both of said intermediate members for the purpose of reversing the direction of rotation at will, by reversing the motor.

6. Transmission mechanism comprising a driving disc wheel and a driven disc wheel apart from each other, a ball in tangential contact with the driving and driven disc wheels, said disc wheels inclining toward each other at an angle smaller than twice the friction angle of the materials in contact, and means revolvably but rigidly to hold said disc wheels in this inclined position at a constant distance from each other.

7. Transmission mechanism comprising a driving disc wheel and a driven disc wheel apart from each other and inclining at an angle toward each other, said angle being smaller than twice the friction angle of the materials in contact, and means revolvably but inflexibly to hold said disc wheels in this inclined position at a constant distance from each other, a ball between them in tangential contact with said driving and driven disc wheels and means to move the ball along its path between the driving and driven disc wheels in such a manner as to vary the speed of rotation of the driven disc wheel.

8. Transmission mechanism comprising a driving disc wheel and a driven disc wheel apart from each other and inclining at an angle toward each other, said angle being smaller than twice the friction angle of the materials in contact, and rigid bearings revolvably but inflexibly to hold said disc wheels in this inclined position at a constant distance from each other, a ball between them in tangential contact with said driving and driven disc wheels and means resiliently to hold the ball in driving contact with the driving and driven disc wheels in any desired position and to move the ball along its path between the driving and driven disc wheels in such a manner as to vary the speed of rotation of the driven disc wheel and to reverse the direction of rotation of the driven disc wheel.

YRJÖ A. AHNGER.

CERTIFICATE OF CORRECTION.

Patent No. 2,209,254.                                      July 23, 1940.

YRJÖ A. AHNGER.

It is hereby certified that error appears in the printed specification of the above numbered patent requiring correction as follows: Page 1, second column, lines 5 and 6, strike out the words and period "Fig. 3 is a modified form of the transmission device."; lines 7 and 10, for "4" read --3--; line 10, for "5" read --4--; lines 11 and 13, for "6" read --5--; line 13, for "7" read --6--; line 14, for "8" read --7--; line 16, for "9" read --8--; line 18, for "10" read --9--; lines 20 and 22, for "11" read --10--; line 22, for "12" read --11--; page 2, first column, line 35, for "Figures 4 and 5" read --Figures 3 and 4--; line 51, and second column, line 19, for "6 and 7" read --5 and 6--; lines 39 and 44, for "7" read --6--; line 67, for "8 to 10" read --7 to 9--; line 68, for "8" read --7--; line 70, for "9" read --8--; line 73, for "10" read --9--; page 3, first column, line 65, for "9 and 10" read --8 and 9--; and second column, line 9, for "Figure 11 and Figure 12" read --Figure 10 and Figure 11--; line 38, for "6" read --5--; and that the said Letters Patent should be read with this correction therein that the same may conform to the record of the case in the Patent Office.

Signed and sealed this 22nd day of October, A. D. 1940.

Henry Van Arsdale, (Seal)                                    Acting Commissioner of Patents.